A. HOUGH.
PACKING MACHINE.
APPLICATION FILED SEPT. 4, 1913.

1,119,162.

Patented Dec. 1, 1914.
6 SHEETS—SHEET 1.

UNITED STATES PATENT OFFICE.

ARTHUR HOUGH, OF BOYERBOURG, QUEBEC, CANADA, ASSIGNOR TO CURTIS'S AND HARVEY, (CANADA), LIMITED, OF MONTREAL, QUEBEC, CANADA, A CORPORATION.

PACKING-MACHINE.

1,119,162.  Specification of Letters Patent.  Patented Dec. 1, 1914.

Application filed September 4, 1913. Serial No. 788,135.

*To all whom it may concern:*

Be it known that I, ARTHUR HOUGH, a resident of Boyerbourg, Province of Quebec, Dominion of Canada, have invented certain new and useful Improvements in Packing-Machines; and I do hereby declare that the following is a full, clear, and exact description thereof.

My invention relates particularly to the packing of substances liable to be hurt in quality owing to uneven density and, possibly, damaged, when subjected to intermittent or continuous excessive pressure during the packing operation; and it has for its object to provide packing means for substances of this nature the power of the motive element of which is automatically variable to meet varying resistance in the substance and capable of being adjusted to and maintained at a standard of packing force varying from a predetermined minimum to a predetermined maximum.

Further objects of the invention are to reduce the friction between the packing elements proper and their supporting members to a minimum; to feed the dynamite through the machine without its density being appreciably varied; to prevent congestion of the dynamite between the packing elements proper; and to reduce to a minimum the danger of premature operation of the packing means and shocks during such operation.

The invention may be said briefly to consist of a machine for packing dynamite and the like comprising a part adapted to support the devices into which the dynamite or other substance is packed, a packing member connected to the rod of a piston and adapted to pack the substance into the devices said piston being carried within a fixed cylinder, a fixed reservoir in communication with the cylinder, means supplying compressed air to the reservoir for the purpose of utilizing the recoil of such air to exert the packing force and means for returning the packing member to initial position.

For full comprehension, however, of my invention reference must be had to the accompanying drawings forming a part of this specification in which similar reference characters indicate the same parts, and wherein.

The machine consists of operated and operating parts supported respectively on separated frames 2 and 3 adapted to be located on opposite sides of the usual partition 4 dividing the building into machine-shop and packing-room.

Figures 15, 22:
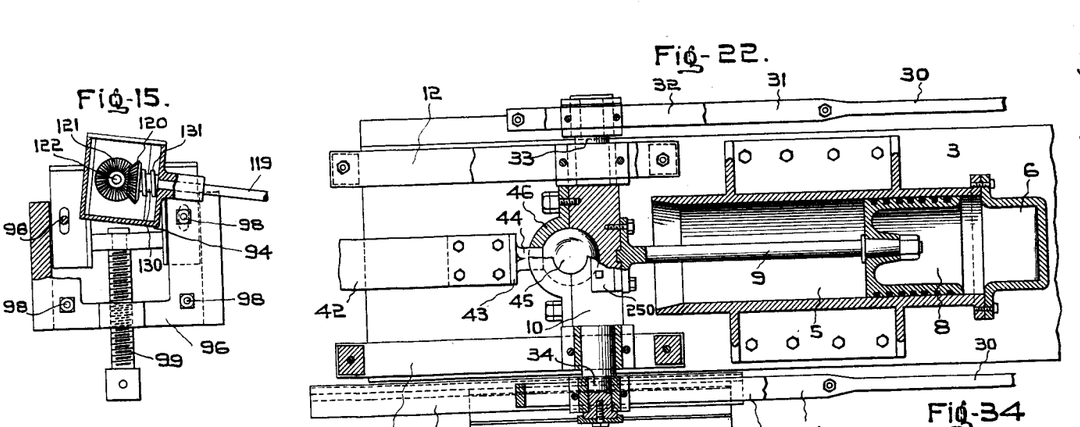
Fig. 22 is a horizontal sectional view taken on line H H Fig. 1, and illustrating, drawn to a larger scale, the cylinder, piston, piston rod, cross-head, connecting rod, guides, and a portion of the cross driven mechanism for returning the cross-head to full back position.
Figures 16, 17, 18, 19:
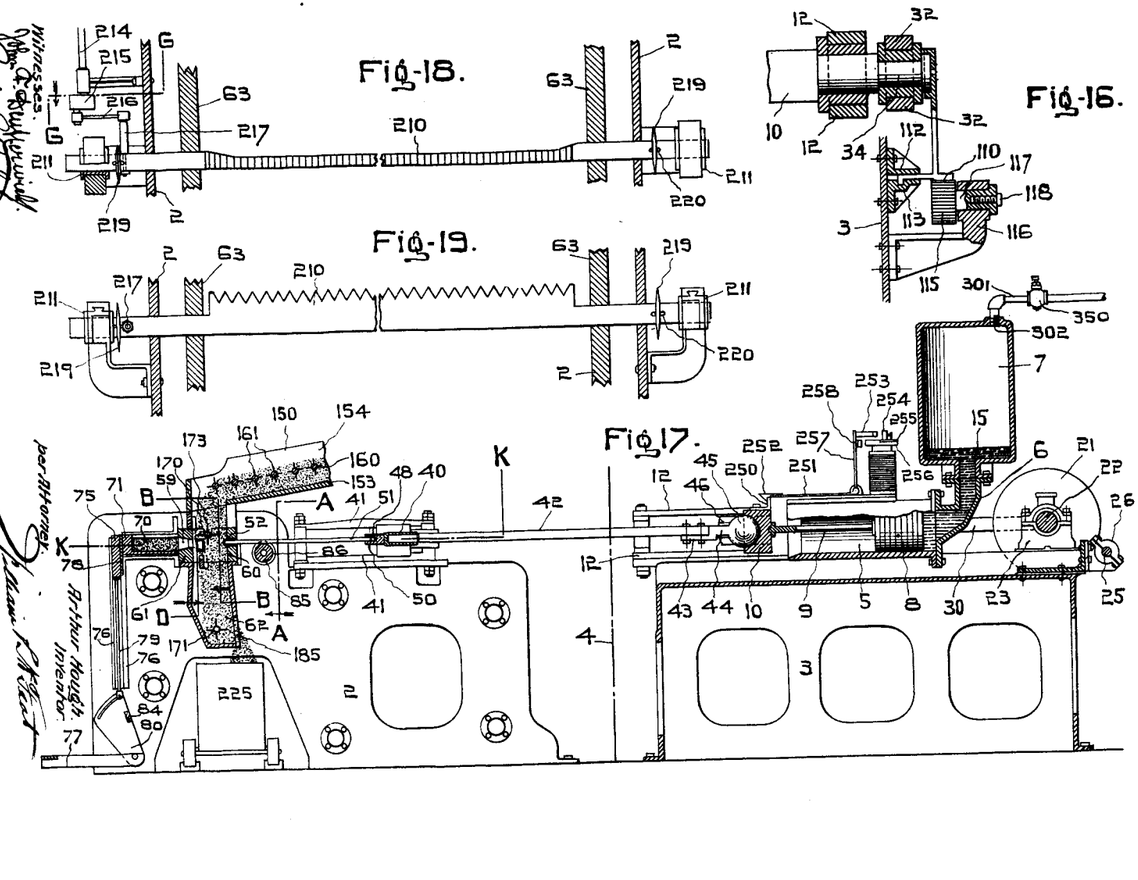
Fig. 16 is a detail transverse vertical sectional view taken on line E E Fig. 1, and illustrating particularly the means for operating the member illustrated in Fig. 3 for supporting the packing sticks.
Fig. 17 is a longitudinal vertical sectional view taken on line C C Fig. 32.
Figs. 18 and 19 illustrate the means for preventing the dynamite from collecting on the front plate of the powder box, Fig. 18 being a plan view of the device and Fig. 19 an elevation disclosed by a sectional view taken on line D D Fig. 17.
Figures 20, 21:
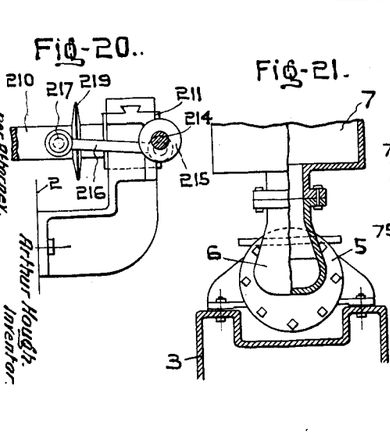
Fig. 20 is a transverse vertical sectional view taken on line G G Fig. 18 and drawn to a larger scale.
Fig. 21 is a detail rear elevation partly in sectional view of the lower portion of the compressed air reservoir, and the cylinder.
Figures 23, 34:
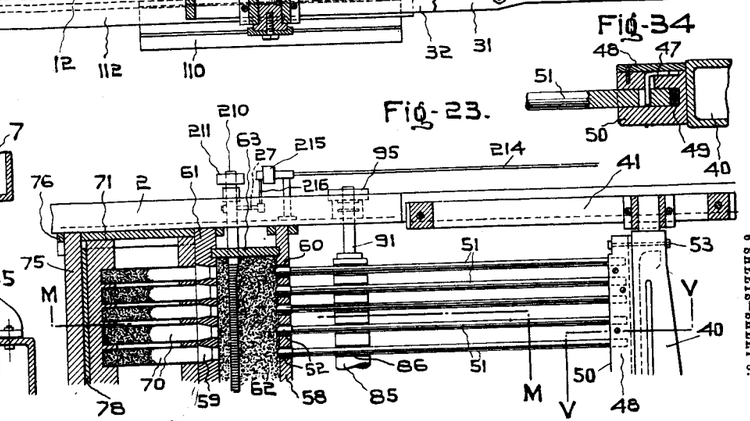
Fig. 23 is a horizontal sectional view taken on line K K Fig. 17, drawn to a larger scale, and illustrating one end of the packing device, powder box and shuttle.
Fig. 34 is an enlarged detailed view.
Figures 24, 25, 26, 27, 30, 31:
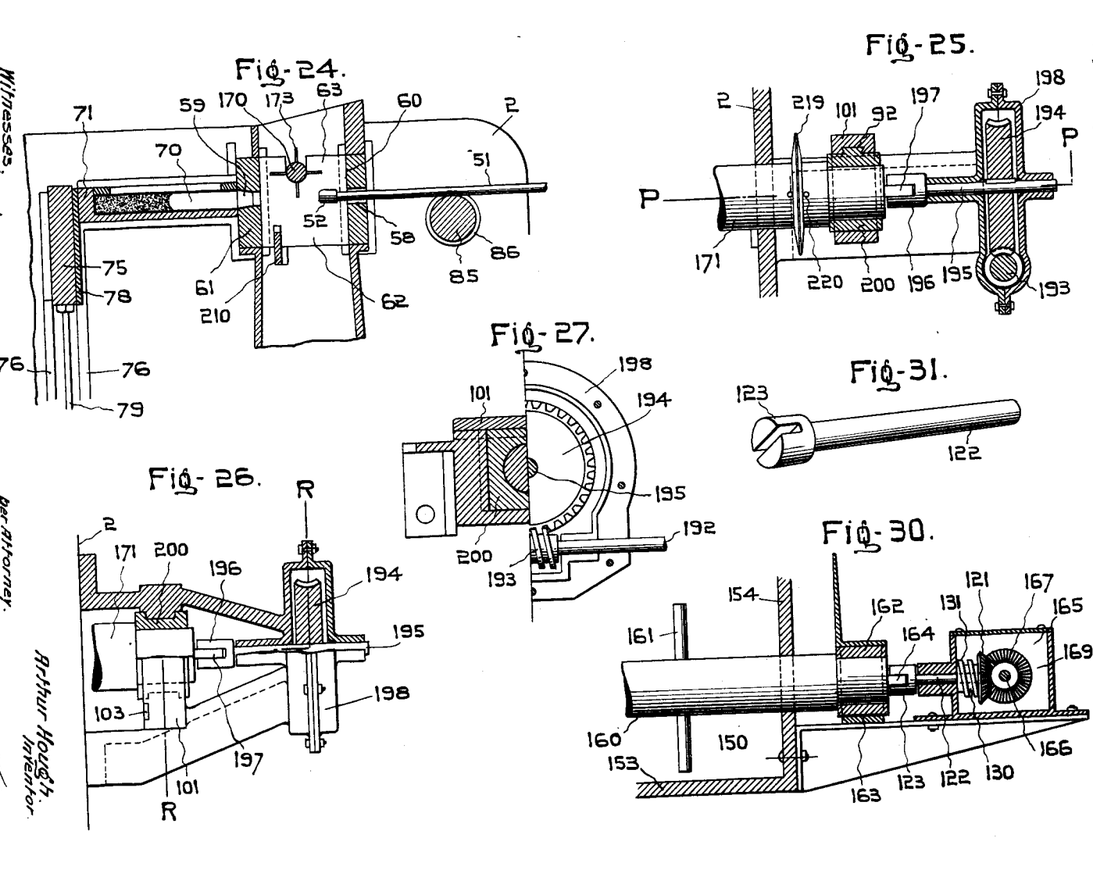
Fig. 24 is a vertical sectional view taken on line M M Fig. 23.
Fig. 25 is a transverse vertical sectional view taken on line N N Fig. 1 drawn to a larger scale.
Fig. 26 is a part plan and part sectional view of the parts illustrated in Fig. 25, the sectional view being taken on line P P Fig. 25.
Fig. 27 is a transverse vertical sectional view taken on line R R Fig. 26.
Fig. 30 is a transverse vertical sectional view taken on line T T Fig. 29.
Fig. 31 is a detail perspective view of the driving spindle of one of the agitators.

To produce an adjustable yielding-resistance and a means whereby the recoil of the yielding resistance will be utilized to exert the packing force a cylinder 5 (Figs. 1, 17, 32, 21 and 22) is mounted rigidly upon the machine frame 3 and is connected by the elbow 6 with a reservoir 7, such elbow presenting a large bore duct for the free passage of an inelastic fluid 15 and for this purpose it is widened as shown particularly in Fig. 21, the end of the cylinder opposite to that carrying the elbow being open as shown particularly in Figs. 17 and 22. A piston 8 within the cylinder sustains the fluid and is connected by a piston-rod 9 with a cross-head 10 supported and guided in a pair of cross-head guides 12 mounted rigidly upon the frame. This cross-head is operatively connected to the packing member proper as will presently be more fully shown.

The reservoir is charged with compressed air through a port in its top, and the pressure established is preferably sufficient and no more to automatically move the cross-head and the parts connected thereto to the forward end of the guides and pack the dynamite with the required density into the cartridges.

The cross-head is returned against the air pressure to the rear end of the guides by a pair of crank disks 20 and 21 mounted rigidly upon a shaft 22 supported in bearings 23 secured upon the top of the frame, the disk 20 having a spur gear periphery driven by a pinion 24 fixed upon a driving shaft 25 carried in bearings 26 and driven by a variable speed electric motor of any preferred type and not shown. A pair of pitmen 30 have their free ends in the form of links 31 and 32 slidably engaging the projecting ends 33 and 34 respectively of the cross-head. The length of the links is such that when at the limit of their rear stroke they will return the cross-head to its full-back position.

The packing mechanism is carried by the part 2 of the machine frame and consists of a yoke 40 slidably supported at its opposite ends in a pair of guides 41, a wooden bar 42 connecting it to the cross-head. The forward end of the bar is bolted to the yoke and the rear end to a plate 43 formed in one piece with the shank 44 of a ball 45 retained within a socket formed by the forward face of the cross-head which is concaved for the purpose and a cap 46 having a hole through which the shank projects; the cap being bolted to the cross-head. The shank is screwed into the ball or connected thereto in any other preferred manner. The yoke (Figs. 1, 17, 23 and 32) has secured to the face thereof a comb consisting of a back 50 having a series of preferably tubular brass packing sticks 51 held in place by pins 47 retained by a cap 48, the pins projecting through holes in the sticks of sufficient diameter to permit play when packing is done and the shock to be entirely taken up by cushions 49, the free ends of the sticks are provided with rubber caps 52 for cushioning purposes, bolts 53 being employed as means for attaching of the back to the yoke. The sticks reciprocate under the joint and alternate action of the compressed air and the crank disks 20 and 21, through openings 58 and 59 in both side plates 60 and 61 respectively of a dynamite box 62 the ends of which are indicated at 63, such box being mounted in the frame 2 of the machine, the openings 59 being flared.

The paper shells 70 of the dynamite sticks are carried in a shuttle 71 also mounted in the frame part 2 in the horizontal plane of the openings 59, the withdrawal of which shuttle is prevented by a movable retaining plate 75, guided in vertical ways 76 and operated by a spring returned treadle 77. A sheet of cushioning material 78 takes up the shock of the packing action. The preferred operative connection between the retaining plate and treadle consists of a pair of rods 79 and a pair of approximately triangular plates 80 (Fig. 17) each having a cam groove therein in which a pin upon the lower end of each of the rods 79 engages; the upper end of the rods being connected to the shuttle retaining plate and the cam-plates to the treadle, while a cross bar 84 unites and braces the cam plates together. Only one of the rods, and cam-plates and springs, respectively is shown.

In order to eliminate all friction between the packing sticks and powder box and proportionately increase the safety of operation of the machine, the sticks are supported in line with the openings 58 by a roller 85 grooved as at 86 to form seats for the sticks by which they are retained in axial alinement with the openings 58. For clear understanding of this roller and the manner of mounting and driving the same reference should be had particularly to Figs. 1, 3, 8, 9, 10, 11, 12, 13, 14, 15, 16, 17, 23, 24 and 31. The roller has trunnions 90 and 91, the former having a tongue 92. These trunnions are journaled in boxes 93 supported in bearings 94 and 95 respectively vertically adjustably carried in brackets 96 and 97 fastened preferably by bolts 98 to the opposite sides of the machine frame, the adjustment being effected by screws 99. The lower halves of the bearing boxes are first set in place in the bearings, then the roller is introduced through an opening 100 in one side of the frame and its trunnions are placed in them after which the top halves are placed in position and locked there by slidable capping plates 101 engaging dovetail keys 102 and locked in place by vertical keys 103 fitted into registering channels in the sides of the bearings and capping plates.

Figure 28:
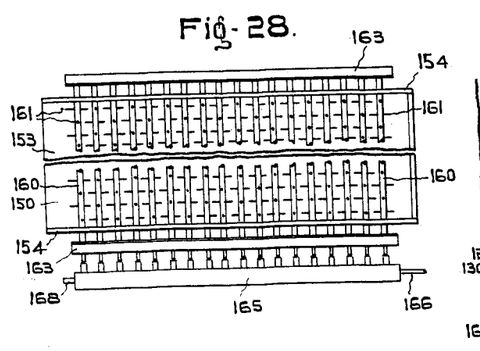
Fig. 28 is a detail plan view showing the general arrangement of the parts of the dynamite tray.
Figure 29:
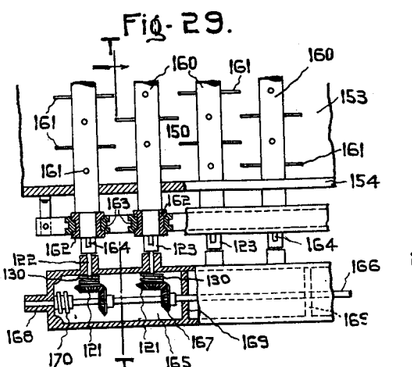
Fig. 29 is a horizontal sectional view taken on line S S Fig. 1 and drawn to a larger scale.

The roller is driven with a surface speed equal to the speed of and with motion following the packing sticks 51 by means of a rack 110 fixed upon the projecting end 34 of the cross-head (see Figs. 1, 16 and 22) and guided in a horizontal slide-way consisting of a pair of guides 112, 113 respectively fastened to the side of the part 3 of the machine. The rack has a raw-hide spur-pinion 115 (Figs. 1, 16 and 32) intermeshing therewith and mounted in a bearing 116 through which its trunnion 117 protrudes, a flexible shaft 118 connecting the trunnion to a rigid shaft 119 (Fig. 1) rotatively secured to a miter gear 120 intermeshing with a second miter-gear 121 (Figs. 11, 13 and 15) mounted rigidly upon a shaft section 122 (Fig. 31) having a slotted head 123 adapted to receive the key 92 upon the roller, the miter gears and shaft section being carried in a box-like enlargement of the bearing 94 in which a lubricant, such as petroleum jelly, for instance, is located. The lubricant is given a tendency to enter the shaft section and the bearings for the shaft section and the hub of bevel gear 120 by a pair of sleeves 130, each having a thread 131 thereon (Fig 9), and fastened upon the latter. The dynamite is charged onto a hopper or tray 150 (Figs. 1, 17, 28, 29, 30) disposed at an incline with its discharge end resting on the frame of the machine part 2, and its rear end supported on legs 152 bolted thereto and the machine frame. This tray consists of a floor 153 and sides 154, the forward and rear ends being open. The dynamite charged upon the tray is fed downwardly along the same and caused to drop over the forward end thereof into the dynamite box 62 by the inclination of the hopper or tray augmented by a series of agitators having the additional function of feeding the dynamite evenly and distributing it over all of the packing. These agitators are shown diagrammatically in Fig. 28 and illustrated in detail in Figs. 29 and 30, and consists of spindles 160 having interdigitating fingers 161 and projected freely through the sides of the hopper or tray, the ends being supported in boxes 162 carried by common bearings 163 and having keys 164 at one end. These keys are engaged by the slotted heads 123 of shaft sections 122 (Fig. 31) having a threaded sleeve 130 (Fig. 9) and a miter gear 121 thereon similar to the construction and arrangement described in connection with the packing stick supporting roller (Figs. 3, 11, 13 and 15). The miter gears of these spindles are located in a lubricant box 165 extending the full length of the hopper or tray and through which extends a shaft 166 having a series of miter gears 167 mounted rigidly thereon and engaging the miter gears of the spindles. This shaft bears at its opposite ends in sleeve bearings 168 and between its ends in spiders 169, and threaded sleeves 170 and the sleeves 130 impart to the lubricant, preferably, petroleum jelly, a tendency to enter the bearings. Rotation is imparted to the shaft by a small individual variable speed electric motor (not shown).

Figure 6:
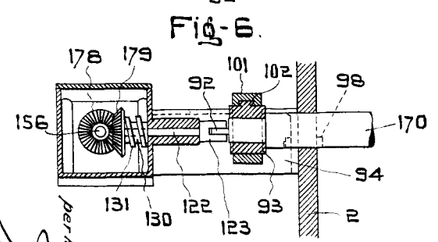
Fig. 6 is a longitudinal vertical sectional view of this bearing on line F F Fig. 5.
Figure 7:
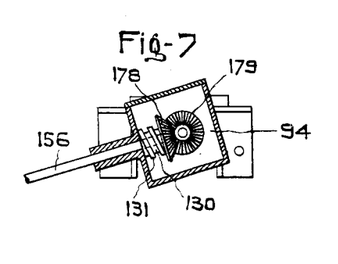
Fig. 7 is a face view thereof.
Figure 9:
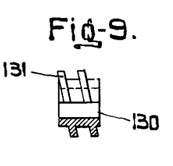
Fig. 9 is a detail elevation partly in sectional view of a part of the lubricating mechanism.
Figure 10:
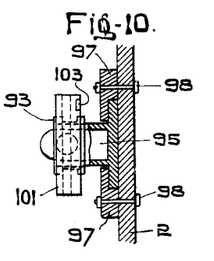
Figs. 10 and 11 are detail plan views partly in horizontal section and partly broken away of the bearings for the stick supporting member illustrated in Fig. 3, and drawn to a larger scale.
Figure 11:
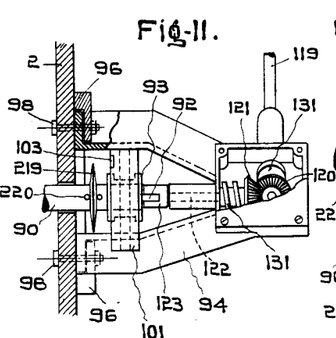
Figure 12:
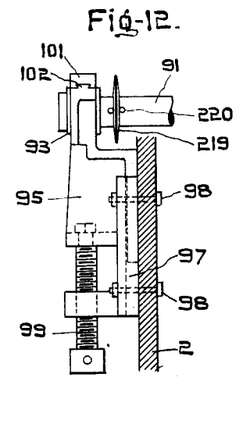
Figs. 12 and 13 are side elevations of these bearings partly in vertical sectional view.
Figure 13:
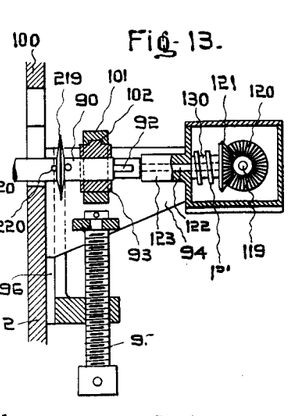
Figure 14:
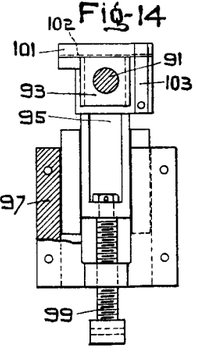
Figs. 14 and 15 are face views thereof partly in section.

The dynamite is caused to fall slowly through the dynamite box by means of agitator-rollers 170 and 171 similar to the agitators of the hopper or tray. The agitator 170 is located with its shaft or spindle slightly above the level of the packing sticks 51, and its fingers 173 (Figs. 4, 17, 24, 32) are spaced to straddle the latter during operation. This roller is driven by lubricated miter-gears 178, 179 (Figs. 5, 6 and 7) operatively connected thereto and supported, all in substantially like manner to operating mechanism (Figs. 8, 9, 11 and 13) of the packing-stick supporting roller; an independently operated variable speed electric motor (not shown) being connected to the gear 178 by flexible and rigid shafts 155 and 156 respectively. The roller 171 is located in the lower end of the dynamite box which has a discharge opening 185, the roller is driven by a variable speed electric motor 190, flexible shaft 191 rigid shaft 192 (Figs. 1 and 32) having a worm 193 (Figs. 25 and 27) mounted rigidly thereon and intermeshing with a worm-wheel 194 keyed upon a shaft-section 195 with a slotted head 196 (Figs. 25, 26 and 31), engaging a tongue 197 upon one end of the roller. The worm and worm-wheel are inclosed in a casing 198, and the opposite ends carried by a bracket 199 bolted to the machine frame; while the opposite ends of the roller are supported in bearing boxes 200 similar to those before described and illustrated in Fig. 8. The dynamite is prevented from caking on the shuttle-side of the box by a saw-toothed blade 210 (Figs. 1, 17, 18, 19, 20, 23, 24 and 32) slidably supported in a pair of bearing boxes 211 similar to the box shown in Fig. 8 but with a square slideway therethrough instead of the bore required for the rollers. Reciprocation is imparted to the blade by an independently driven electric motor (not shown), flexible and rigid shafts 213 and 214 respectively, a crank disk 215, and a pitman 216 connecting the disk to a pin 217 extending laterally from the saw-toothed blade. The dynamite is prevented from working along the blade and the several rollers by radially tapered disks 219 secured in place preferably by pins 220. A car 225 (Figs. 1 and 17) receives the surplus dynamite fed through the box and discharged through opening 185

The operating part 3 of the machine is operatively connected and disconnected from the packing member as desired by electrical means consisting of an electrically operated trip device upon the operating part of the machine, and constructed and arranged to engage the packing member and retain the same from movement under the dynamic force of the compressed air when packing is not to be done, and release it for packing purposes. The electrical means is further adapted to so release the packing member that no shock will occur between the links 32 and the cross-head 10.

Figures 1, 2, 3, 4:
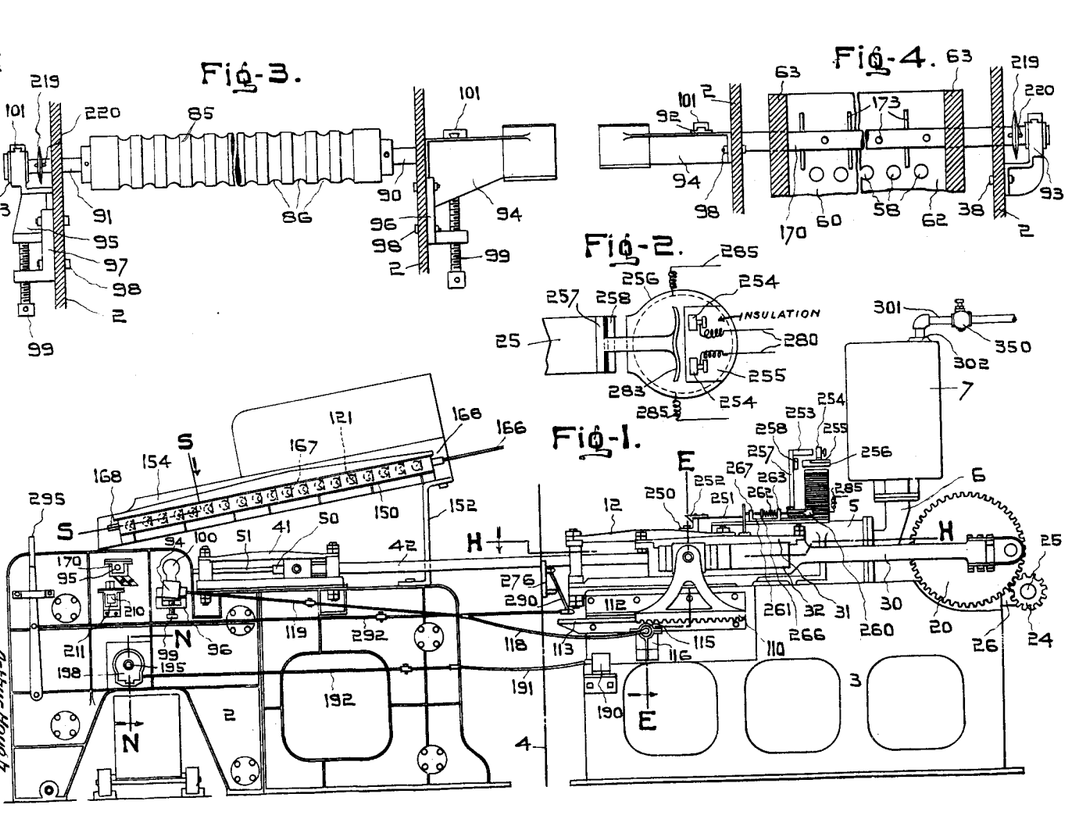
Figure 1 is a side elevation of my improved machine.
Fig. 2 is a detail plan view of a portion of the electrical trip device.
Fig. 3 is a detail sectional view taken on line A A Fig. 17 and illustrating particularly the means for supporting the packing sticks with minimum friction.
Fig. 4 is a detail sectional view taken on line B B Fig. 17 and illustrating particularly the upper agitator in the powder box.
Figures 5, 8:
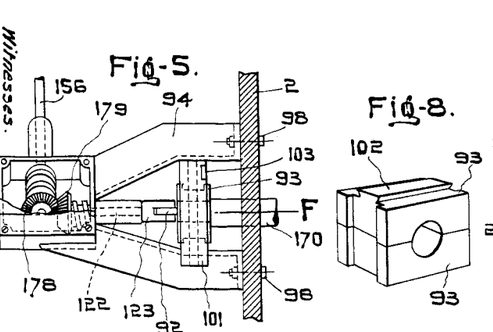
Fig. 5 is a detail plan view of the left-hand bearing of the agitator illustrated in Fig. 4, and drawn to a larger scale.
Fig. 8 is a detail perspective view of one of the bushings with which the bearings are provided.

The electrical mechanism comprises a standard 250 fastened upon the cross-head 10, (Figs. 1, 2, 17, 22, 23 and 32) a latch of bell-crank-lever form the horizontal arm 251 of which has a head 252 for engaging the standard and the vertical arm 257 a contact bridge 253 arranged to, under certain conditions, close the gap between a pair of contacts 254 (Figs. 1 and 2). These contacts are carried by and insulated from a block 255 mounted on the top of and constituting the active pole of an electro-magnet 256 which, when energized, attracts the vertical arm of 257 and lifts the trip through the medium of such vertical arm which constitutes the armature and has an extension 258 in juxtaposition with the pole 255. A gap in the opening circuit is provided between a second pair of contacts 259 mounted rigidly upon an insulating plate 265 fastened for convenience upon the cylinder 65. This gap (Figs. 32 and 33) is at times closed by a bridging contact 260 carried by a bolt 261 and normally yieldingly retained out of contact by a spring 262 encircling the bolt and bearing between a lug 263 carried rigidly by the insulating plate and a collar 266 fastened rigidly upon the bolt which is slidingly guided in the lug 263 and a second and corresponding lug 267 through which it protrudes forwardly. This protruding end of the bolt is engaged and the bridging piece 260 is shifted into bridging relation with the contacts 259 by an arm 270 extending laterally from the link 32.

Figure 32:
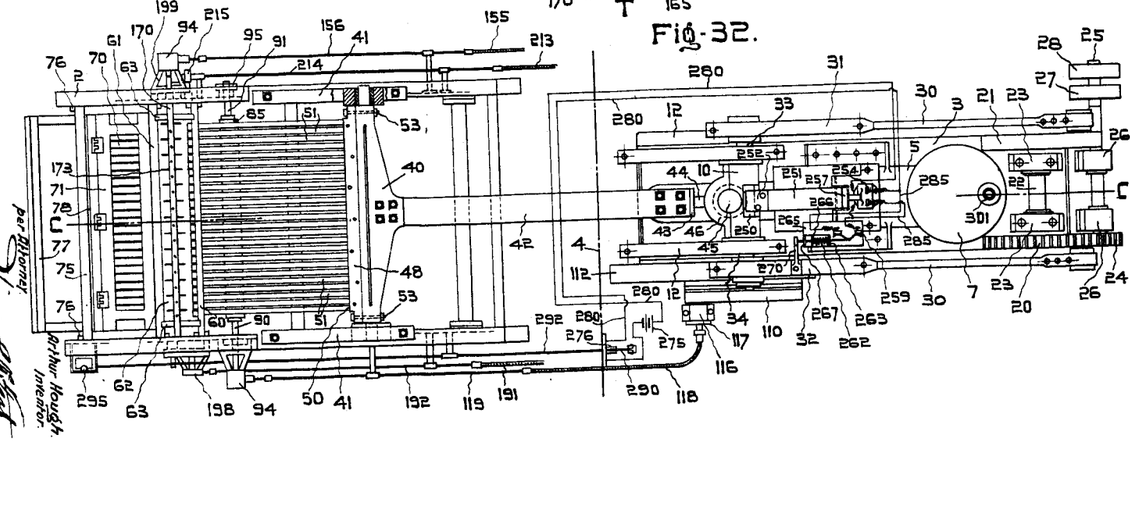
Fig. 32 is a plan view of the complete machine with the powder tray removed.
Figure 33:
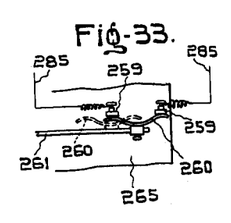
Fig. 33 is an enlarged detail plan view of a portion of the electrical means for controlling the operation of the packing member proper.

The electric power for energizing the magnet is derived from any available source of direct current and a main switch 276 is included with contacts 254 in a main circuit 280 indicated diagrammatically in Fig. 32 leading from one pole of the line to the magnet, from the magnet to one of the terminals 254, and from the other terminal 254 to the opposite pole of the line. A branch circuit 285 leads from the opposite sides of the main circuit to the contacts 259. The blade 290 of the switch 276 is operated from the front of the machine through a rod 292 by a lever 295. The operation of this electrical mechanism is as follows:—Upon the operator pushing the lever rearwardly the current will be shut off from the main circuit and the magnet be demagnetized and the detent 251 allowed to fall and engage the standard 250 and retain the cross-head and consequently the yoke and packing sticks upon the next rearward stroke of the links. When the operator pulls the lever forwardly, assuming that the link-operating mechanism is not stopped, no current will flow, and, consequently, the magnet will not be energized until the links return to full back position. In this position the arm 270 engages the bolt 261 and shifts it rearwardly and causes the bridge 260 to close the gap between the contacts 259. The current then flows and energizes the magnet which attracts the armature, thus bringing the bridge 253 into contact with the contacts 254 and at the same time raising the detent and releasing the cross-head simultaneously with the commencement of the next succeeding forward stroke of the links. The effect being that shock due to impact between the links and cross-head is completely obviated and the main circuit remains closed until the operator again opens the switch.

The dynamite is charged onto the inclined hopper 150, and, when the operating portion of the machine is started, the dynamite fed by the rotary agitators 160 falls from the hopper into the dynamite box 62 and is maintained therein at a predetermined level and density by the agitators 170, 171, the latter serving also as an ejector and discharges the dynamite which falls into the car. The speed of rotation of the feeding agitators in the hopper or tray and dynamite box is relatively regulated to maintain the required depth and density of the dynamite in the box by varying the speed of the motors. The shuttle 71 carrying the shells 3 to be packed is placed on the table with the protruding ends of the shells fitted into the flared mouths of the throats in the front plate 61 of the dynamite box. In the meantime the links 31, 32 are continuously reciprocated out of operative connection with the cross-head 10, and when the operator is ready for the packing to commence he throws the main switch over which has the effect of lifting the detent 251 as described above. When the piston is at the rear end of its stroke the level of the inelastic fluid is preferably about one inch above the bottom of the reservoir, and the pressure of the air is maintained sufficient, and no more, to move the piston forwardly with the force required to pack the dynamite lightly at first and under slightly increasing pressure until the shells are filled. During operation the links move forward and the cross-head accompanies them and as the shells fill, the pressure exerted by the air increases proportionally as the extent of expansion is reduced, the progress of the sticks being arrested by the dynamite inserted thereby into the shells. On the return stroke of the links they pick up the cross-head and take it back to its initial position; and when the detent is lowered it engages and retains it as above mentioned.

In order to maintain a predetermined pressure of air in the reservoir an automatic air pump is operatively connected by the tube 301 to the reservoir. The pressure is determined by a suitably operated relief valve indicated at 350.

What I claim is as follows:—

1. In a dynamite packing machine the combination with a packing member, of means whereby a yielding resistance actuates the member to perform its work, such means comprising a fixed compressed air reservoir, and a fixed cylinder, a piston in the cylinder, a tool, and means operatively connecting the piston to the tool and means for returning the member.

2. In a dynamite packing machine the combination with a packing member, of a reservoir for containing a compressed elastic fluid, a fixed cylinder, a piston within the cylinder, a fluid conductor connecting the reservoir to one end of the cylinder, means connecting the opposite side of the piston to the member, and means for moving the piston toward the reservoir against the pressure in the latter.

3. In a dynamite packing machine the combination with a packing member of a reservoir for containing compressed elastic fluid, a fixed cylinder, a piston within the cylinder, a fluid conductor connecting the reservoir to one end of the cylinder, means connecting the opposite side of the piston to the member, and power driven means for automatically moving the piston toward the reservoir against the pressure in the latter.

4. In a dynamite packing machine the combination with a chamber for passage therethrough of a substance to be packed and means for supporting adjacent thereto a receptacle for the substance to be packed, and a packing member working through the chamber and packing substance therefrom into the receptacle, of a reservoir for containing a compressed elastic fluid, a fixed cylinder, a piston within the cylinder, a fluid conductor connecting the reservoir to one end of the cylinder, means connecting the opposite side of the piston to the member, and means for moving the piston toward the reservoir against the pressure in the latter.

5. In a dynamite packing machine the combination with a chamber for passage therethrough of the dynamite to be packed and means for supporting adjacent thereto a receptacle for the dynamite to be packed, and a packing member working through the chamber and packing dynamite therefrom into the receptacle, of a reservoir for containing a compressed elastic fluid, a fixed cylinder, a piston within the cylinder, a fluid conductor connecting the reservoir to one end of the cylinder, means connecting the opposite side of the piston to the member, and power driven means for intermittently moving the piston toward the reservoir against the pressure in the latter.

6. In a dynamite packing machine the combination with the frame of the machine, of a shuttle mounted upon the frame and having a plurality of dynamite cartridge receptacles, of a powder box contiguous to the shuttle and having in communication therewith the cartridge receptacles of the shuttle, a yoke having a plurality of packing sticks in alinement with the cartridge receptacles, a device supporting the sticks with their ends projecting into the powder box, power driven means for intermittently moving the yoke in one direction, means acting in unison with the said member for moving the yoke in an opposite direction consisting of a reservoir for containing a compressed elastic fluid, a cylinder, a piston within the cylinder, a fluid conductor connecting the reservoir to one end of the cylinder, means connecting the opposite side of the piston to the member, means for causing the device to travel with a surface speed equal to that of the sticks, and means for feeding dynamite through the powder box.

7. In a dynamite packing machine the combination with the frame of the machine, of a shuttle mounted upon the frame and having a plurality of dynamite cartridge receptacles, of a powder box contiguous to the shuttle and having in communication therewith the cartridge receptacles of the shuttle, a yoke having a plurality of packing sticks in alinement with the cartridge receptacles, a device supporting the sticks with their ends projecting into the powder box, a power driven means for intermittently moving the yoke in one direction, means acting in unison with the said member for moving the yoke in an opposite direction consisting of a reservoir for containing a compressed elastic fluid, a cylinder, a piston within the cylinder, a fluid conductor connecting the reservoir to one end of the cylinder, means connecting the opposite side of the piston to the member, means for causing the device to travel with a surface speed equal to that of the sticks, means for feeding dynamite through the powder box, and means for maintaining a given density of the dynamite in the powder box.

8. In a dynamite packing machine the combination with the frame of the machine, of a shuttle mounted upon the frame and having a plurality of dynamite cartridge receptacles, of a powder box contiguous to the shuttle and having in communication therewith the cartridge receptacles of the shuttle, a yoke having a plurality of packing sticks in alinement with the cartridge receptacles, a device supporting the sticks with their ends projecting into the powder-box, power-driven means for intermittently moving the yoke in one direction, means acting in unison with the said member for moving the yoke in one direction, means for causing the device to travel with a surface speed equal to that of the sticks, means for feeding dynamite through the powder box, and means for agitating the dynamite in the powder box for the purpose of preventing conjection thereon between the sticks.

9. In a dynamite packing machine the combination with the frame of the machine, of a shuttle mounted upon the frame and having a plurality of dynamite cartridge receptacles, of a powder box contiguous to the shuttle and having in communication therewith the cartridge receptacles of the shuttle, a yoke having a plurality of packing sticks in alinement with the cartridge receptacles, a device supporting the sticks with their ends projecting into the powder box, power-driven means for intermittently moving the yoke in one direction, means acting in unison with the said member for moving the yoke in an opposite direction, and means for causing the device to travel with a surface speed equal to that of the sticks, means for feeding dynamite through the powder box, a hopper communicating with the upper end of the powder box, of a series of agitators in the hopper, an agitator in the powder box above the level of the sticks, an agitator at the discharge opening of the powder box and means for operating the agitators in unison.

10. In a dynamite packing machine the combination with the frame of the machine, of a shuttle mounted upon the frame and having a plurality of dynamite cartridge receptacles, of a powder box contiguous to the shuttle and having in communication therewith the cartridge receptacles of the shuttle, a yoke having a plurality of packing sticks in alinement with the cartridge receptacles, a device supporting the sticks with their ends projecting into the powder box, power-driven means for intermittently moving the yoke in one direction, means acting in unison with the said member for moving the yoke in an opposite direction, and means for causing the device to travel with a surface speed equal to that of the sticks, means for feeding dynamite through the powder box, a hopper communicating with the upper end of the powder box, a series of agitators in the hopper, an agitator in the powder box above the level of the sticks an agitator at the discharge opening of the powder box, means for operating the agitators in unison, a horizontal saw toothed plate within the powder box adjacent to the cartridge side thereof and means for reciprocating the plate.

11. In a dynamite packing machine the combination with the frame of the machine, of a shuttle mounted upon the frame and having a plurality of dynamite cartridge receptacles, of a powder box contiguous to the shuttle and having in communication therewith the cartridge receptacles of the shuttle, a yoke having a plurality of packing sticks in alinement with the cartridge receptacles, a device supporting the sticks with their ends projecting into the powder box, means acting in unison with the said member for moving the yoke toward the shuttle consisting of a reservoir for containing a compressed elastic fluid, a cylinder, a piston within the cylinder, a fluid conductor connecting the reservoir to one end of the cylinder, means connecting the opposite side of the piston to the yoke, and power driven means for intermittently moving the piston toward the reservoir against the pressure of the latter, means for causing the device to travel with a surface speed equal to that of the sticks, and means for feeding dynamite through the powder box.

12. In a dynamite packing machine the combination with the frame of the machine, of a shuttle mounted upon the frame and having a plurality of dynamite cartridge receptacles, of a powder box contiguous to the shuttle and having in communication therewith the cartridge receptacles of the shuttle, a yoke having a plurality of packing sticks in alinement with the cartridge receptacles, a device supporting the sticks with their ends projecting into the powder box, means for moving the yoke toward the shuttle and power driven means for intermittently moving the yoke away from the shuttle, means for causing the device to travel with a surface speed equal to that of the sticks, means for feeding dynamite through the powder box, a hopper communicating with the upper end of the powder box, of a series of agitators in the hopper, an agitator in the powder box above the level of the sticks, an agitator at the discharge opening of the powder box and means for operating the agitators in unison.

13. In a dynamite packing machine the combination with a packing member; of means whereby a yielding resistance actuates the member to perform its work; such means comprising a fixed compressed air reservoir, a fixed cylinder, a piston in the cylinder, and means operatively connecting the piston to the packing member; means for returning the member, means for at times retaining the member while the returning means operates; such means comprising a standard mounted on the packing member and a latch of bell-crank form adapted to engage the said standard and electrically operated means for releasing the retaining means.

14. In a dynamite packing machine the combination with a packing member, of means whereby a yielding resistance actuates the member to perform its work, means for returning the member, means for at times retaining the member while the returning means operates, such means comprising a standard mounted upon the packing member and latch of bell-crank-form the horizontal arm whereof is adapted to engage the said standard and electrically operated means for releasing the retaining means such means comprising an armature upon the upper end of the vertical arm of the said latch, an electro-magnet and means for energizing the said magnet.

15. In combination with a packing member, of means whereby a yielding resistance actuates the member to perform its work, means for returning the member, a detent for engagement with the packing member, for retaining the same in full back position, an armature upon the detent, an electro-magnet adjacent to the armature a main circuit including the magnet and having a break, a contact bridge upon the detent, a pair of contact pieces constituting the terminals of the break and disposed in position to be electrically connected by the contact bridge, a branch circuit extended from the opposite sides of the break in the main circuit and having a break with a pair of contact terminals, a contact bridge in operative connection with the power driven member and operating in unison therewith, such latter contact bridge being adapted to at times close the break in the branch circuit. and a manually operated switch in the main circuit.

16. In a dynamite packing machine the combination with the frame of the machine, of a shuttle mounted upon the frame and having a plurality of dynamite cartridge receptacles, of a powder box contiguous to the shuttle and having in communication therewith the cartridge receptacles of the shuttle, a yoke having a plurality of packing sticks in alinement with the cartridge receptacles a device supporting the sticks with their ends projecting into the powder box, means acting in unison with the said member for moving the yoke toward the shuttle power driven means for intermittently moving the yoke away from the shuttle, means for feeding dynamite through the powder box, a detent mounted on a fixed part carried by the machine frame and constructed and arranged for engagement with the yoke for retaining the same in full back position, an armature upon the detent, an electro-magnet adjacent to the armature, a main circuit including the magnet and having a break, a contact bridge upon the detent, a pair of contact pieces constituting the terminals of the break and disposed in position to be electrically connected by the contact bridge, a branch circuit extended from the opposite sides of the break in the main circuit and having a break with a pair of contact terminals, a contact bridge in operative connection with the power driven member and operating in unison therewith, such latter contact bridge being adapted to at times close the break in the branch circuit, and a manually operated switch in the main circuit.

17. In a dynamite packing machine the combination with the frame of the machine, of a shuttle mounted upon the frame and having a plurality of dynamite cartridge receptacles, of a powder box contiguous to the shuttle and having in communication therewith the cartridge receptacles of the shuttle, a yoke having a plurality of packing sticks in alinement with the cartridge receptacles a device supporting the sticks with their ends projecting into the powder box, means for moving the yoke toward the shuttle power driven means for moving the yoke away from the shuttle, means for feeding dynamite through the powder box, a hopper communicating with the upper end of the powder box, of a series of agitators in the hopper, an agitator in the powder box above the level of the sticks, an agitator at the discharge opening of the powder box, means for operating the agitators in unison, means carried by the yoke a detent mounted on a fixed part carried by the machine frame and constructed and arranged for engagement with the means carried by the yoke for retaining the same in full back position, an armature upon the detent, an electro-magnet adjacent to the armature, a main circuit including the magnet and having a break, a contact bridge upon the detent, a pair of contact pieces constituting the terminals of the break and disposed in position to be electrically connected by the contact bridge, a branch circuit extended from the opposite sides of the break in the main circuit and having a break with a pair of contact terminals, a contact bridge in operative connection with the power driven member and operating in unison therewith, such latter contact bridge being adapted to at times close the break in the branch circuit, and a manually operated switch in the main circuit.

In testimony whereof I have signed my name to this specification in the presence of two witnesses.

ARTHUR HOUGH.

Witnesses:
WILLIAM J. C. HEWETSON,
E. R. PETTS.

Copies of this patent may be obtained for five cents each, by addressing the "Commissioner of Patents, Washington, D. C."